United States Patent [19]
Bayer et al.

[11] 3,797,956
[45] Mar. 19, 1974

[54] MACHINE TOOL HOLDER AND DRIVING MEANS

[76] Inventors: Jack L. Bayer, 1640 E. Bethany Home Rd., Phoenix, Ariz. 85016; Walter J. Breitkopk, 7720 E. Heatherbrae, Scottsdale, Ariz. 85251

[22] Filed: Dec. 15, 1972

[21] Appl. No.: 315,610

[52] U.S. Cl. .................................. 408/35, 90/11 A
[51] Int. Cl. ......................... B23b 29/30, B23c 1/00
[58] Field of Search ........... 408/31, 35, 36; 90/11 A

[56] References Cited
UNITED STATES PATENTS

| | | | |
|---|---|---|---|
| 1,104,517 | 7/1914 | Landau | 408/35 |
| 3,191,260 | 6/1965 | Jorgensen | 408/35 |
| 3,413,702 | 12/1938 | Burg | 408/35 |
| 3,691,899 | 9/1972 | Bruno et al. | 90/11 A |

*Primary Examiner*—Harrison L. Hinson

[57] ABSTRACT

A machine tool holder and driving means for holding various tools such as drills, taps, milling cutters, etc., wherein a tool holder carries such a tool and is readily and easily removably connected to a driving spindle mechanism whereby several tools may be successively used and changed rapidly relative to said spindle mechanism; the tool holder having separate concentric means removably engageable with cooperative and conforming areas on the spindle mechanism for maintaining accurate concentric and axial alignment of the tool holder with the spindle, the said concentric means being disengageably held in accurate connection by a power operated draw bar in the spindle mechanism and spring loaded shear pin mechanism intermeshes between the tool holder and spindle to provide driving torque resistance; the said concentric means being devoid of conventional locking taper structure so as to be freely and accurately engageable and disengageable.

7 Claims, 8 Drawing Figures

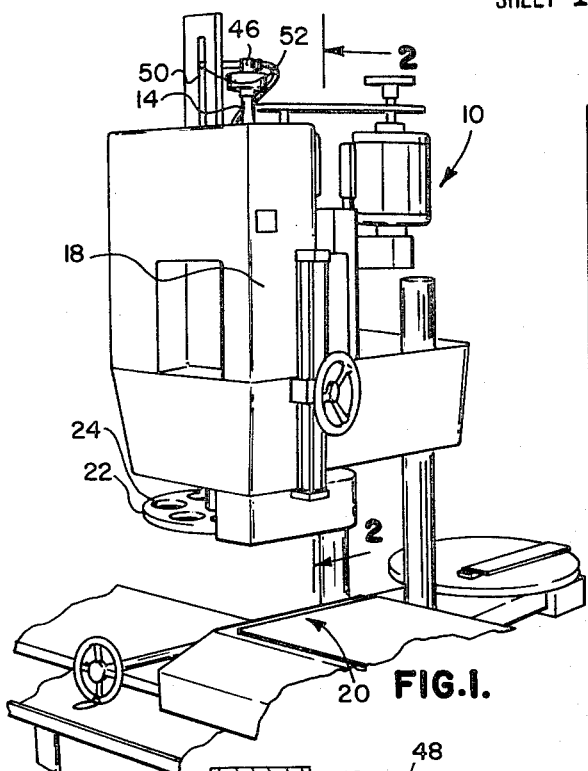
FIG.1.
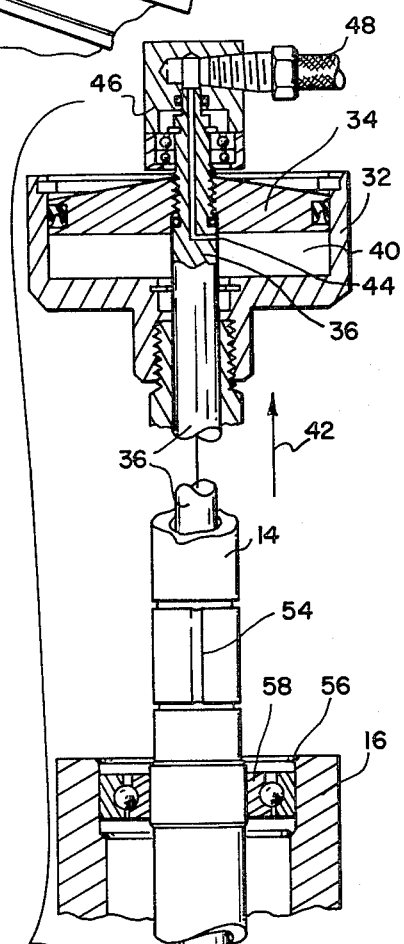
FIG.2.
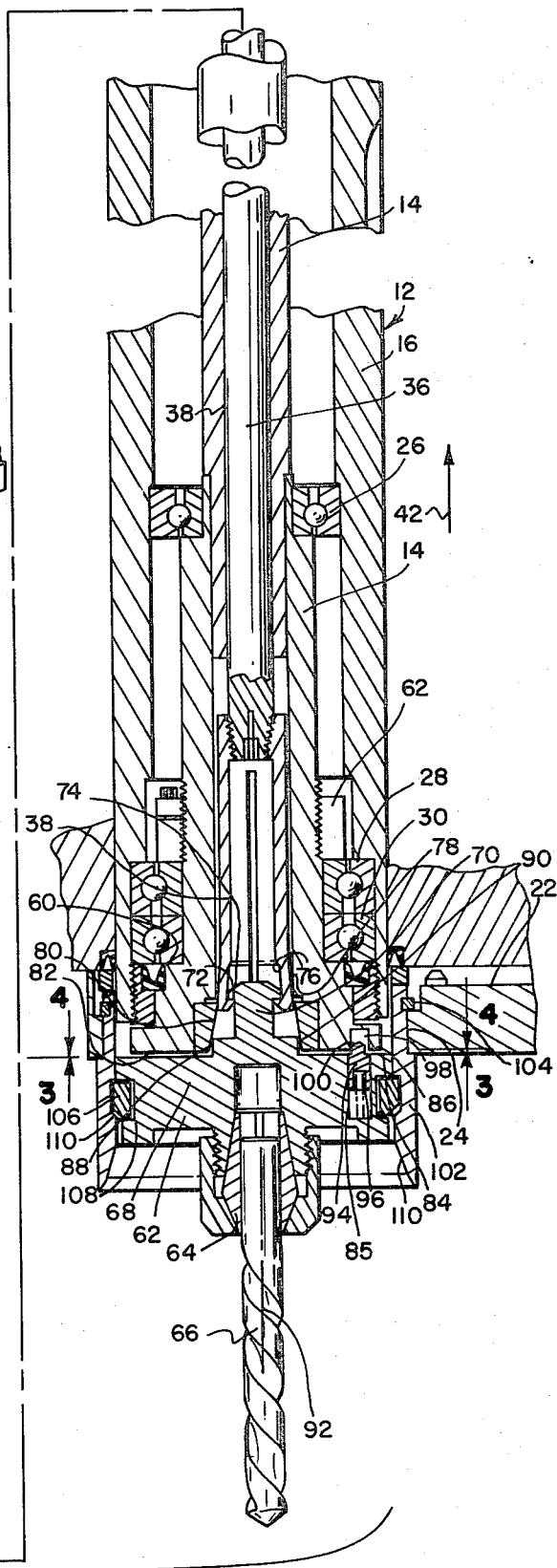

MACHINE TOOL HOLDER AND DRIVING MEANS

BACKGROUND OF THE INVENTION

Tool holders for various machines have been used for supporting drills, taps, milling cutters and various other tools. These tool holders have employed conventional tapered shanks which have generally been taper locked into converging bore portions of machine tool spindles. With such taper locking mechanism there has been a requirement for substantial force in the engagement and disengagement of tool holders and in many instances such tool holders have failed to maintain a locked relationship with a spindle during such operations as might be performed in a milling machine or the like. Additionally, taper locking devices have not been satisfactory in automatic machines which require mechanism allowing automatic changing of tool holders with a predetermined force and time element as may be encountered in the operation of an automatic machine which performs several successive operations with several different tools. Taper locking mechanisms have maintained tool holders in concentric and axial aligned relation with spindles but the force required to accurately engage them and disengage them is somewhat unpredictable and additionally, taper locking shanks on tool holders have tended to work loose and cause accidents as well as inaccuracies in machining various parts. Another undesirable factor in the use of taper locking shanks on tool holders is that they are quite long and require substantial axial movement of the tapered shank of such tool holders into respective spindles and additionally these conventional prior art tool holders are therefore undesirable for rapid and accurate use on automatic machines where tool holders must be automatically connected and disconnected relative to a driving spindle.

SUMMARY OF THE INVENTION

The present invention relates to a machine tool holder and driving means which may, for example, be useful in connection with machines such as those described in U.S. Pat. No. 3,639,071 issued Feb. 1, 1972. Such a machine is disclosed in FIG. 1 of the present application.

The tool holder of the invention comprises novel tool holder structure and driving spindle structure, the tool holder having a short axially extended stub provided with an annular ledge thereon which is engageable by resiliently expandable fingers provided with inwardly directed ledges and connected to a draw bar in the driving spindle of the invention. The tool holder and the spindle having planes of abutment disposed at right angles to the axis of rotation of the tool holder and spindle and concentric intermeshing structure of the tool holder and the spindle provide concentricity while the engaging planes provide for normality of the tool holder and spindle so that very accurate axial alignment of the tool holder and the tool carried thereby may be attained relative to the rotary and reciprocable axis structure of the driving spindle.

Resiliently retractable shear pins are carried by the tool holder and are readily extendable into recesses in the spindle and the recesses as well as the shear pins are disposed in respective annular rows on an axis common to the spindle and tool holder, and the number of shear pins and respective recesses vary so that at least one shear pin may be engaged in one of the recesses whenever the tool holder is retracted by the draw bar into engagement with the spindle. Ths spindle is provided with a housing reciprocably mounted in the frame of the machine and rotatably mounted in the housing is a hollow shaft which carries the draw bar of the spindle mechanism therein. The draw bar is reciprocably mounted in the hollow shaft and actuated by a power operated actuator coupled to the upper end thereof and a rotatable coupling supplies energy to the actuator and is guided in a rectilinear manner by a guide as the housing of the spindle mechanism is moved longitudinally along its axis.

The machine to which the present tool holder is adapted and as shown in FIG. 1, carries a rotary turret plate having a plurality of tool holder receiving openings disposed in an annular row and the annular row is concentrically offset relative to the axis of the spindle and tool holder so that as the turret plate rotates it may present any one of several tool holders carried in the tool holder receiving openings of said turret plate.

Resiliently releasable detent means holds each tool holder in a respective tool holder receiving opening of the turret plate and when a respective tool holder receiving opening is aligned with the axis of the driving spindle of the invention, the spindle may be moved downwardly into position wherein the collet in connection with the draw bar engages the short stub on a respective tool holder in one of the tool holder receiving openings carried in the turret plate so that the draw bar may readily retract the tool holder into firm engagement with the spindle whereupon further advancement of the spindle axially forces the tool holder out of the respective resilient detent means in the turret plate and allows the tool, such as a drill or the like, to be projected into work on a table which is disposed in spaced relation to the aforementioned turret plate. The collet engageable stub of the tool holder of the invention is very short and requires a short stroke of the draw bar in the spindle mechanism for retracting the tool holder into accurate concentric connection with the spindle without the need for locking tapers and such that the tool holder is drivingly connected to the spindle and is also axially aligned therewith for accurate operation of a tool in connection with the tool holder. Further, inasmuch as the draw bar is maintained energized during the entire time that the tool is being used in the tool holder, there is no tendency of the tool holder to work loose relative to the spindle which drives it.

The spindle, when retracted away from work being machined, forces the tool holder back into the resilient detent means carried by the turret plate and the draw bar may then be released from the respective tool holder so that the spindle may be moved out of interference therewith to allow another tool holder to be aligned with the spindle for a successive different machining operation.

Accordingly, it is an object of the present invention to provide a novel tool holder and driving spindle mechanism which does not require any taper locking mechanism to removably connect a tool to a driving spindle.

Another object of the invention is to provide a very simple and accurate combination of mechanism for connecting and disconnecting a tool holder relative to a driving spindle which includes a concentric stub engaged by a retractable draw bar actuated collet and wherein concentric intermeshing means of the tool holder and the spindle, as well as abutting planes normal to the rotary axis of the spindle and the tool holder provide for accurate axial alignment of the tool holder without the need for locking tapers and also wherein the tool holder and spindle are connected to provide torque transmission from the spindle to the tool holder by means of spring loaded plungers or pins which extend from the tool holder into the respective recesses in the spindle.

Another object of the invention is to provide a tool holder and driving spindle mechanism, particularly adapted for machines equipped for automatically selecting and changing tools relative to a reciprocable and rotatable driving spindle.

Further objects and advantages of the invention may be apparent from the following specification, appended claims and accompanying drawings.

BRIEF DESCRIPTION OF THE DRAWINGS

FIG. 1 is a perspective view of an automatic machine tool to which the tool holder and driving means of the present invention may readily be adapted;

FIG. 2 is a fragmentary axial sectional view of a tool holder together with a driving spindle mechanism and a tool holder supporting turret plate;

DESCRIPTION OF THE PREFERRED EMBODIMENTS

Figures 3, 4, 5:
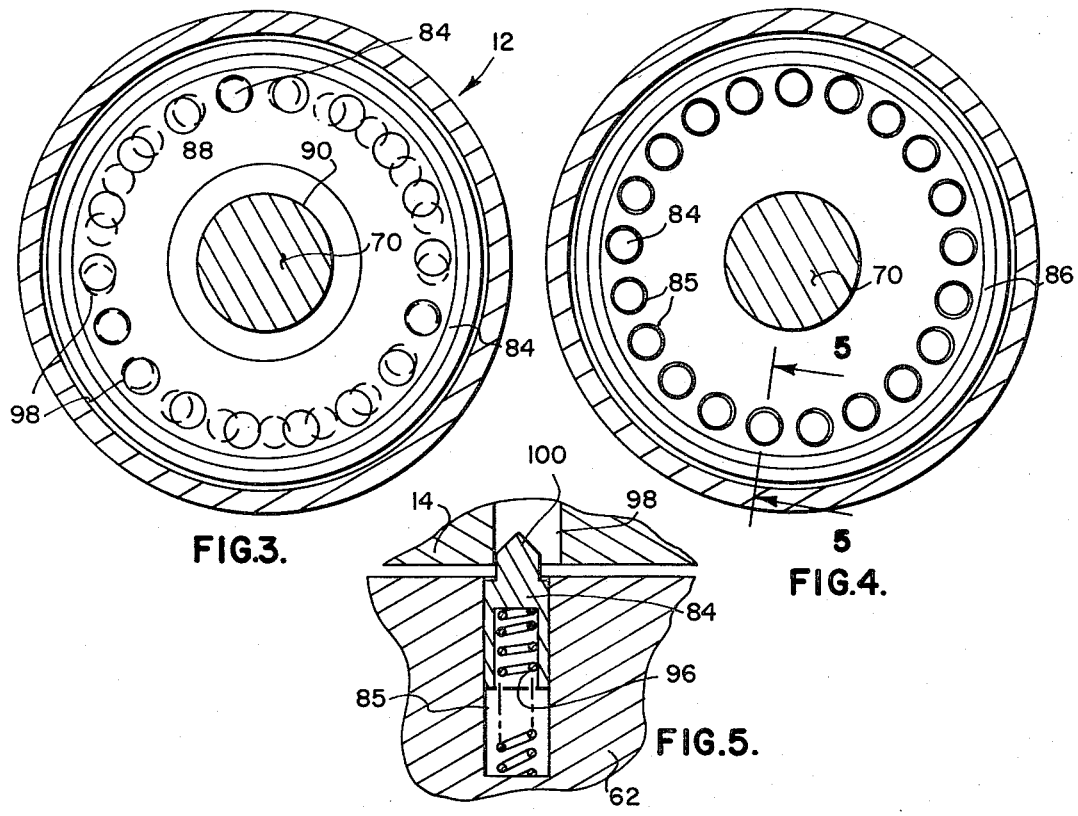
FIG. 3 is a sectional view taken from the line 3—3 of FIG. 2.
FIG. 4 is a sectional view taken from the line 4—4 of FIG. 2.
FIG. 5 is an enlarged fragmentary sectional view taken from the line 5—5 of FIG. 4.

As shown in FIG. 1, the machine 10 is an automatic machine adapted to successively perform several machining operations and requires a variety of tools readily disposed for connection with a driving spindle mechanism 12, shown in detail in FIG. 2 of the drawings, and which is provided with a shaft means 14 disclosed in FIG. 1, said shaft means 14 being concentric with the axis of the spindle mechanism 12, all as shown best in FIGS. 1 and 2 of the drawings. The spindle mechanism 12 is provided with a hollow housing 16 which is longitudinally reciprocable relative to a frame 18 of the machine 10 and this machine 10 is provided with work holding table means 20 adapted to hold work spaced from a tool holding turret plate 22 in which tool holders of the invention are held, as will be hereinafter described in detail. This turret plate 22 is annular and provided with an annular row of tool holder receiving openings 24 and this annular row of tool holder receiving openings 24 rotates such that each opening 24 may be brought into axial alignment with the shaft 14 and the spindle mechanism 12 so as to connect and disconnect various tool holders relative to the spindle mechanism 12 as will be hereinafter described.

The hollow housing 16 of the spindle mechanism 12 is provided with a bore in which bearings 26, 28 and 30 are mounted and which rotatably support the hollow shaft 14 in the housing 16.

Coupled to the extending end of the hollow shaft 14 is an actuator housing 32 having a piston 34 reciprocally mounted therein. This piston 34 is coupled to a draw bar shaft 36 which extends longitudinally in a bore 38 in the hollow shaft 14. This draw bar 36 is coupled to a collet mechanism 38, as will be hereinafter described in detail.

The actuator housing 32 is provided with a pressure fluid receiving chamber 40 adapted to act upon the piston 34 and withdraw the drawbar in the direction of an arrow 42 in FIG. 2 of the drawings. The drawbar 36 is provided with a passage 44 adapted to conduct fluid into the chamber 40 and this passage 44 comminicates with a rotatable coupling 46 which is rotatably mounted on the upper end of the drawbar and adapted to conduct pressure fluid through a conduit 48. The coupling 46 and the conduit 48 are stationarily held against rotation by an upstanding guide 50 mounted on the frame 18 of the machine 10. The guide is provided with a slot in which a hollow conduit support 52 may traverse to guide the tube 48 and to prevent the coupling 46 from rotating while the shaft 14, as well as the actuating housing 32 and draw bar 36 rotate in the spindle housing 16 by means of the bearings 26, 28 and 30.

The shaft 14 is provided with external connection means 54 adapted to carry a pulley or some other rotary driving means for rotating the hollow shaft 14 as desired, this structure being similar to the usual reciprocating spindles of drill presses, boring mills, or other similar machine tools.

It will be seen that the housing 16 of the spindle mechanism also comprises an open end 56 wherein another bearing 58 supports the hollow shaft 14. This bearing 58 is axially aligned with the bearings 26, 28 and 30, hereinbefore described.

It will be understood that the bearings 26, 28 and 30 are preloaded thrust bearings to restrain the hollow shaft 14 against axial movement relative to the spindle housing 16.

It will be seen that the bearing 30 is jammed against a shoulder 60 on the shaft 14 and that the bearing 28 is jammed against the bearing 30 in the conventional manner to preload the ball bearings in the races and a screw threaded collar 62, screw threaded on the shaft 14, forces the bearing 28 against the bearing 30.

As shown in FIG. 2 of the drawings, a tool holder 62 of the invention is provided with a chuck 64 adapted to hold a drill 66, or any other tool such as a milling cutter, tap, or the like, in connection with the tool holder. The tool holder 62 is therefore equipped with a chuck 64 for fixing a tool thereto.

The tool holder 62 is provided with a generally circular in cross section body 68 having a concentric collet engageable stub 70. This stub 70 is short and provided with an annular ledge 72 which is engageable by inwardly directed ledges 74 of resiliently expandable collet fingers 76. These collet fingers are provided with externally tapered portion 78 adapted to engage a converging bore structure 80 in the shaft 14 of the spindle mechanism and this converging bore portion converges away from an end 82 of the spindle which is engaged by the tool holder 62.

The converging bore structure is such that withdrawal of the collet fingers 76 into the converging bore portion 80 forces the ledges 72 of the fingers to engage the annular ledge 74 of the stub 70 of the tool holder 62. As the draw bar 36 is retracted in a direction of the arrow 42 by means of the piston 34 in the actuator housing 32, the collet fingers 76 pull the tool holder 62 into firm engagement with the end 82 of the shaft 14 of the spindle mechanism 12.

The tool holder is provided with an annular plane 84 which engages a complemental annular plane 86 on the end 82 of the shaft 14 of the spindle mechanism 12 and a concentric cylindrical bore portion 88 at the end of the converging bore structure 80 receives a conforming annular shoulder 90 of the stub 70 of the tool holder 62 and these cylindrical portions 88 and 90 are intermeshing in very close tolerance relationship with each other to maintain concentricity of the tool holder 62 relative to the spindle shaft 14. Additionally, the planes 84 and 86 of the tool holder and spindle are at precise right angles to the common axis of rotation of the tool holder and spindle mechanism, said axis of rotation being designated by a broken line 92 in FIG. 2 of the drawings.

Accordingly, the normality of the planes 84 and 86, together with the concentric intermeshing portions 88 and 90, provide accurate connection of the tool holder relative to the spindle mechanism when the draw bar 36 is retracted pulling the stub 70 in the direction of the arrow 42 in FIG. 2 of the drawings. In order to provide torque resistance to the rotation of the tool holder relative to the spindle shaft, shear pins 94 are mounted in openings in the tool holder and springs 96 tend to project these shear pins into recesses 98 in the end of the shaft 14 of the spindle mechanism 12. The shear pins 94 are arranged in an annular row about the common axis 92 and correspond directly with an annular row of the recesses 98 so that the pins engage in the openings 98 to provide torque resistance to relative rotation of the spindle and tool holder.

The number of pins 94 may vary relative to the recesses 98, as for example there may be as many as 19 of the pins 94 and 20 of the recesses 98. With a varying number of the recesses relative to the pins, tapered end portions 100 of some of the pins may readily drop into some of the recesses 98 so that the tool holder is automatically engaged with the spindle to resist torque resistance and these pins, together with the planes 84 and 86 and the intermeshing concentric structures 88 and 90, completely avoids the necessity of using locking tapers and provides a short stroke quick connection of a tool holder with the driving spindle which is particularly adapted for use in connection with automatic machines in which successive tools must be used for performing a variety of different machining operations in rapid succession.

Each tool holder 62 is carried in one of the openings 24 of the rotary turret plate 22. A cylindrical retainer 102 is carried in each opening 24 and held therein by means of a snap ring 104. A detent ring 106 is carried in an annular groove 108 of each tool holder 62 and projects into a respective groove 108 in the bore of the retainer 102. The bore of the retainer 102 is provided with a converging portion 110 disposed below the groove 108 and adapted for radial camming of the detent ring 106 upward and into the groove 108. Likewise, the groove 108 is provided with a tapered bore portion 110 adapted for downward compressive action on the detent 106 to permit axial movement of the tool holder 62 downward and outward of the retainer 102 to carry the drill or other tool 66 into engagement with work on the work holding table 20.

While the draw bar 36 holds the tool holder 62 in place, the shear pins 102 provide rotatable locking of the tool holder relative to the shaft 14 and axial alignment is maintained as hereinbefore described.

When it is desired to retract the tool holder into the retainer 102, the spindle housing 16 is moved in an upward direction in the position as shown in FIG. 2 whereby the resilient detent 106 moves upwardly in the converging bore 110 of the retainer 102 and snaps into the groove 108 whereupon the draw bar 36 may be released by movement of the piston 34 in a direction opposite to the arrow 42 which allows the resilient fingers 70 of the collet mechanism to expand and release from the annular ledge 72 of the stub 70, whereupon the tool holder 62 is released from the spindle and it may move away therefrom and out of interference with the respective tool holder and out of interference with the turret plate 24 so that the turret plate 24 may be rotated around a distance to the next tool to be used which will be carried in another one of the openings 24 in the turret plate 22.

It will be appreciated that the short stroke of the collet fingers 76 and the short length of the stub 70 provides for very rapid connection and disconnection of the tool holder relative to the spindle mechanism and that the planes 84 and 86, together with the concentric intermeshing mechanism 88 and 90, together with the shear pins 100, provides for very accurate axial alignment as well as driving torque for operating a tool 66 in connection with the tool holder 62 when it is coupled to the spindle mechanism by means of the draw bar 36 and actuator 32.

Reference is made to FIGS. 3, 4 and 5 showing the annular rows of the shear pins 84 and their pointed ends 100, as well as the recesses 98 in which the pins are engaged. The difference in the number of pins and recesses, is shown in FIGS. 3 and 4, and it will therefore be apparent that at least one or more of the pins will be engaged in respective recesses automatically as the tool holder is drawn into engagement with the spindle shaft 14.

As shown in FIGS. 2 and 4 of the drawings it will be seen that the pins 84 are reciprocally mounted in openings 85 wherein the springs 96 are disposed to force the pins 84 outwardly toward the spindle mechanism. Also shown in detail in FIG. 4 is the annular face 86 which is engaged by the annular face 84 disclosed in FIG. 3 of the drawings.

As shown in 3 of the drawings, the concentric cylindrical bore 88 and the intermeshing shoulder 90 of the stub 70 are precisely concentric to each other and are fitted together in very close tolerance relationship to maintain concentricity of the tool holder 62 relative to the spindle shaft 14.

Figure 7:
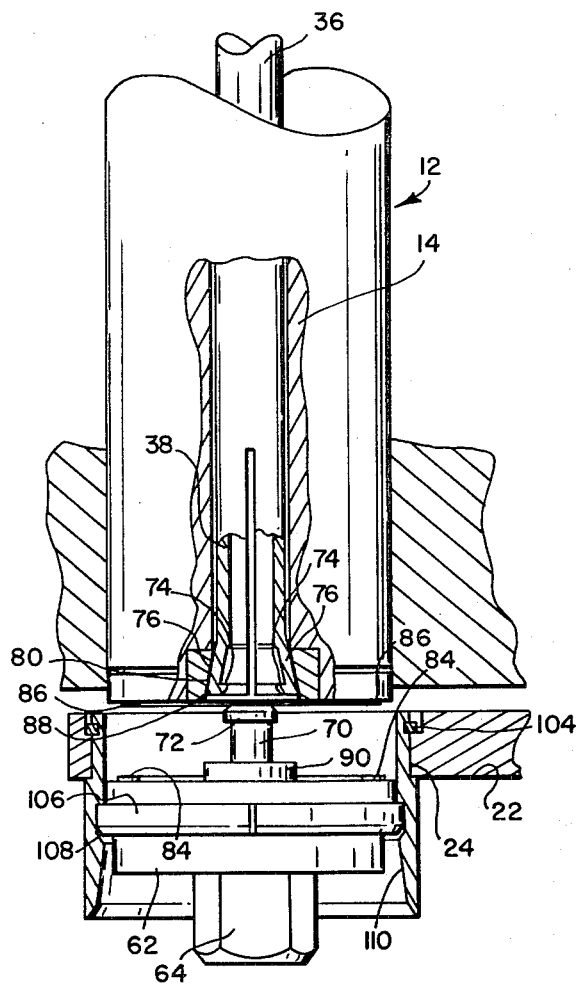
FIG. 7 is a fragmentary side elevational view of the spindle and tool holder mechanism of the invention showing portions broken away and in section, and illustrating portions of the machine frame and tool holder supporting turret plate and illustrating a collet in connection with the draw bar of the spindle mechanism is extended and open position for engaging a stub on the tool holder of the invention.
Figure 8:
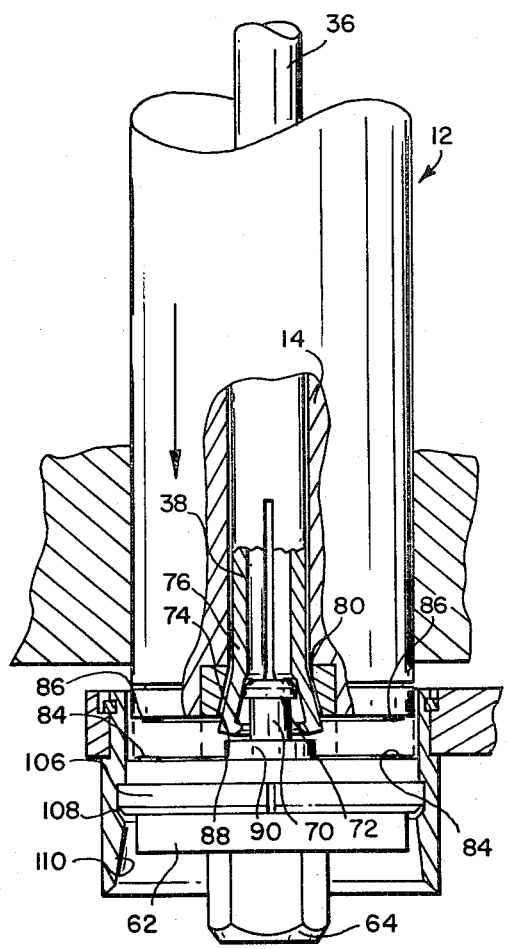
FIG. 8 is a view similar to FIG. 7 but showing the draw bar and its respective collet in position for retracting the stub of the tool holder for securing the tool holder into secure and accurate axial alignment with the driving spindle mechanism.

As shown in FIGS. 7 and 8, the draw bar 36 and collet 38 are moved toward the tool holder 62 such as to dispose the resilient fingers 76 into the diverging end of the converging bore 80 so that the fingers with their normal resiliently open tendency will expand away from each other such that their ledges 74 will clear the ledge 72 on the stub 70. With further downward movement of the spindle mechanism 12, the ledges 74 on the collet fingers 76 pass the annular ledge 72 of the stub 70 and then further downward movement of the converging bore portion 88 beyond that shown in FIG. 8 of the drawings causes the fingers to slide downward and also as the converging bore passes thereover the fingers are forced inwardly until the ledges 74 thereof engage the annular ledge 72 of the stub 70, at which time the planes 84 and 86 of the tool holder 62 and the spindle, respectively, are engaged, and the draw bar retracts and holds these planes tightly engaged with each other. At this time the intermeshing concentric portions 90 and 88, respectively, of the tool holder 62 and the spindle shaft 14 are intermeshed for concentric operation.

Figure 6:
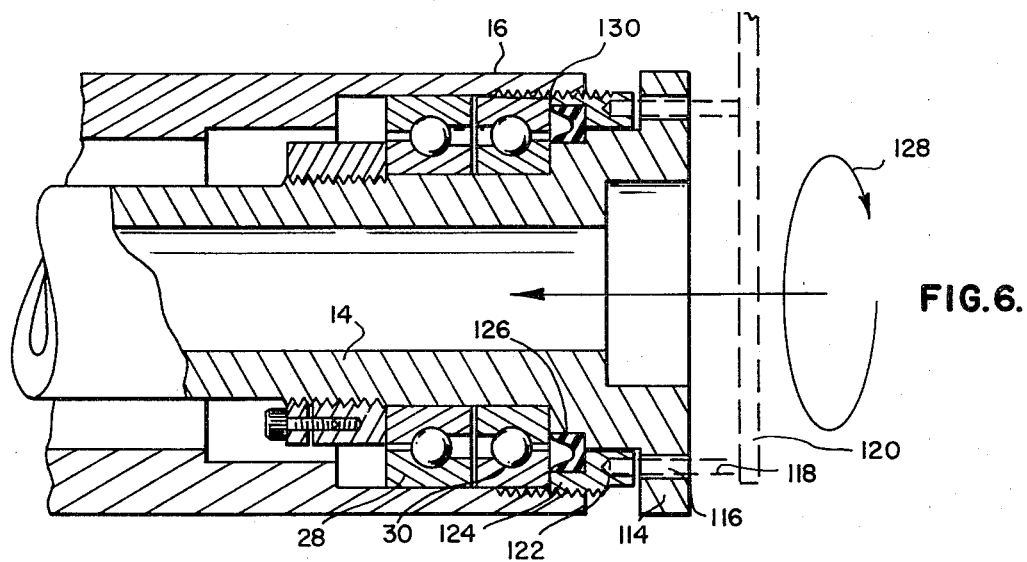
FIG. 6 is an enlarged fragmentary sectional view taken on the same plane as that of FIG. 2, showing the structure in greater detail.

As shown in FIG. 6 of the drawings, an enlarged flange end portion 114 of the shaft 14 is provided with openings 116 therein. These openings 116 admit pins 118 of a spanner wrench 120 shown by broken lines, these pins projecting through the openings 116 and engaging recesses 122 in an annular screw threaded nut 124, which engages against the bearing 30 adjusting its preload relative to the bearing 28.

An oil seal 126 is also retained by the screw threaded retainer ring 124.

It will be seen that the spanner wrench 120 may be rotated as indicated by an arrow 128 and at the same time the shaft 14 is rotated as the screw threaded retainer ring 124 is screw threadably tightened in an internally screw threaded bore portion 130 of the spindle housing 16.

It will be obvious to those skilled in the art that various modifications may be resorted to without departing from the spirit of the invention.

We claim:

1. In a machine tool holder and driving means, the combination of: a frame; a tool driving spindle axially reciprocably and rotatably mounted relative to said frame; a power operated draw bar reciprocally mounted concentrically in said spindle; said spindle having a tool holder engaging end; said end having a collet receiving converging bore which converges away from said end and into said spindle; a radially expandable collet in said converging bore; said collet coupled to said draw bar; said collet having fingers tending resiliently to deflect radially outward toward said bore and to move apart when said draw bar is actuated reciprocably toward said tool holder engaging end of said spindle; a tool holder having a chuck adapted to hold a drill or other tool therein; said tool holder having a collet engaging stub provided with a peripherally disposed annular ledge; said collet fingers having inwardly directed ledges adapted to engage said annular ledge of said tool holder when said collet is retracted into said converging bore to force said fingers radially inward; said fingers of said collet when engaged with said annular ledge on said stub of said tool holder adapted to draw said tool holder toward and into engagement with said tool holder engaging end of said spindle in response to operation of said draw bar in a direction away from said last mentioned end; said tool holder and said spindle having concentric close tolerance annular axially meshing portions; said annular meshing portions adapted to attain precise concentricity of said tool holder relative to said spindle and to fix said tool holder and spindle precisely on a common axis of rotation; said tool holder and said spindle having respective first and second annular planes normally abutted with each other and held together by force of said draw bar retracting said stub of said tool holder in a direction away from said tool holder engaging end of said spindle; said annular planes precisely disposed at right angles to said common axis of rotation of said tool holder and spindle; said spindle constituting a driving member; said tool holder constituting a driven member; one of said members having a generally annular row of recesses therein; said row concentric to said common axis of rotation; the other of said members carrying a generally annular row of spring loaded projectible means; said generally annular row of projectible means being disposed on a common radius with said recesses and concentric about said common axis of rotation; one of said members having openings therein; said projectible means reciprocably movable in said openings and being spring loaded to move reciprocably partially out of said openings and to engage in said recesses.

2. The invention as defined in claim 1, wherein: said projectible means comprise pins having tapered ends; the number of said projectible means in said respective annular row different than the number of said recesses in the respective annular row whereby at least one of said pins may readily be aligned and engage in one of said recesses when said draw bar draws said annular plane of said tool holder into engagement with the respective annular plane of said spindle.

3. The invention as defined in claim 1, wherein: a rotatable turret plate is carried by said frame and rotatable on an axis offset from and parallel to said common axis; said turret plate having an annular row of tool holder receiving openings therein; said tool holder receiving openings being disposed to rotate into alignment with said spindle; one of said tool holders being reciprocably held in a respective one of said tool holder receiver openings; resiliently yieldable detent means for holding said tool holder therein, whereby said spindle may engage said tool holder and force it axially out of the respective tool holder receiving opening and toward work to be machined by a drill or other tool held in said chuck of said tool holder; and a table for holding work to be machined in juxtaposition relative to said frame and spaced from said turret plate to allow clearance thereof as said plate is successfully rotated to dispose various tool holders in alignment with said spindle.

4. The invention as defined in claim 1, wherein: said annular axially meshing portions of said tool holder and spindle are constituted by a close tolerance cylindrical bore portion of said spindle concentric with said common axis and disposed at the diverging end of said converging bore; said stub of said tool holder having an annular external shoulder closely engageable with said cylindrical bore portion.

5. The invention as defined in claim 1, wherein: said spindle is provided with a hollow housing reciprocably mounted on said frame; a hollow power driven shaft rotatably mounted and axially restrained in said housing; said shaft being hollow; said draw bar being mounted in said hollow shaft and axially reciprocable therein; and a power operated actuator carried by said shaft for reciprocably moving said draw bar in said hollow shaft; and a rotary coupling on said actuator for transmitting power thereto.

6. The invention as defined in claim 5, wherein: an elongated rectilinear guide is disposed on said frame; said guide disposed for guiding said coupling to prevent it from rotating with said shaft and actuator; and to allow said coupling to move along said guide as said housing reciprocates longitudinally along said common axis.

7. The invention as defined in claim 5, wherein: said actuator is a pressure fluid actuator having a movable member coupled to said draw bar.

* * * * *